Oct. 11, 1960 J. R. HEFELE 2,956,115

FACSIMILE TRANSMISSION SYSTEM WITH MODIFICATION OF INTERMEDIATE TIME SIGNAL

Filed Aug. 12, 1957 2 Sheets-Sheet 1

INVENTOR
J. R. HEFELE
Harry C. Hart
ATTORNEY

INVENTOR
J. R. HEFELE
BY Harry C. Hart
ATTORNEY

United States Patent Office 2,956,115

Patented Oct. 11, 1960

2,956,115

FACSIMILE TRANSMISSION SYSTEM WITH MODIFICATION OF INTERMEDIATE TIME SIGNAL

John R. Hefele, Yonkers, N.Y., assignor to Bell Telephone Laboratories, Incorporated, New York, N.Y., a corporation of New York Filed Aug. 12, 1957, Ser. No. 677,583

15 Claims. (Cl. 178—6.6)

This invention relates to the translation, transmission, reception and reproduction of electric communication signals, particularly image signals and the like.

Progress in electronic picture transmission, facsimile, and related fields has developed to such an extent that text or pictorial information may now be economically and accurately transmitted from one location to another. Although the advances in these fields have made possible the development of systems having relatively low cost, ease of operation and reliability, there remains the economic need for a reduction in the electrical channel width required for such electric signals, together with an accompanying increase in the speed of transmission.

A principal object of the invention is to effect a substantial reduction in the width of the frequency band required for the transmission of such image signals as compared with the bandwidth required when the transmission is effected by the apparatus and in accordance with the methods commonly in use.

Economy in the transmission of electrical signals on the one hand requires the use of a narrow bandwidth channel. Transmission systems are well known in which electrical image signals are propagated through a narrow band channel, either radio or telephone, without sacrifice of definition or resolution by substantially increasing the picture transmission time.

The usual facsimile service subscriber, to the contrary, seeks a communication facility having a relatively high transmisison speed, i.e., reduced transmission time, and a definition adequate for the intended purpose. However, conventional commercial facsimile systems have been characterized heretofore by generally large bandwidth-transmission time products. This means that facsimile signals can be transmitted over a band limited channel either with high definition and a correspondingly increased transmission time, or in a relatively short period of time in exchange for a high degree of signal degradation appearing primarily as a loss of resolution, but not both.

It is becoming increasingly desirable in business circles that interoffice data be rapidly transmitted over narrow band private lines from different locations in the office and between other offices in the same or distant cities. These data may be in the form of printed or typewritten material or handwritten notes, lined drawings, or signatures. Delivery of the data should preferably be concurrent with the request for it, or at least such delivery should occasion a minimum of delay. Hence, the entire copy should be transmitted in a few seconds. A satisfactory facsimile service, therefore, must maintain adequate resolution and at the same time avoid an increase in the transmission time, even through the available channel is of considerably reduced bandwidth.

It is a common feature of most facsimile systems that the process of analyzing successively the densities of individual elements of the copy to produce electrical signal counterparts of the individual elements, commonly called scanning, is effected by instantaneously viewing the individual elements with an electron beam, a spot of light, or the like. Since it oftentimes happens that message material offered for facsimile transmission contains detail finer than necessary for complete intelligibility of the message, the bandwidth-time product can be reduced by the use of a coarse or enlarged scanning spot at the transmitter as well as the receiver. This expedient permits the transmission time to be held to a suitably short period by greatly reducing the resolution of the signal. However, fine detail portions of the material having smaller linear dimensions than the scanning spot may be lost altogether so that the facsimile service loses its intended usefulness.

Business data generally contains printed or typewritten matter of uniform width and handwritten material having fine detail portions, such as thin strokes in a written signature, which are oftentimes essential to a clear recognition of the data or signature. Sufficient resolution must, therefore, be maintained in the system to preserve the identity of these thin strokes. Yet, it is an economic waste to employ a scanning spot at the transmitter station small enough to translate contrast changes into the maximum change of signal amplitude since the peak-to-peak amplitude of the signal is reduced effectively by the bandwidth limitation of the transmission medium. This is particularly true when the bandwidth is adjusted to satisfy the resolution requirements of the subscriber at the receiver station.

The present invention takes as its starting point the view that economy in the transmission of electrical signals can best be achieved by selecting the channel bandwidth, the speed of transmission, and the resolution necessary for a just satisfactory reproduction at the receiver station in strict accordance with the character of the particular service to be rendered, and with the nature of the material to be transmitted. Thus, the usual avenue of approach to the realization of facsimile economy ordinarily involving a modification of known facsimile or television techniques, geared primarily to an entertainment standard, has been abandoned and one which is manifestly suitable for a particular subscriber service has been adopted.

It is another object of this invention to permit high speed facsimile signals representative of physically motionless pictures to be transmitted over narrow band transmission facilities with a resolution comparable to that of a wide band signal.

It is another object of the invention to permit the benefits of high resolution scanning to be retained in lower definition systems.

It is a specific object of the present invention to present an acceptable substitute for a perfect facsimile record in which the usual consequences of high speed narrow band transmission in the form of degradation are minimized.

In accordance with the invention and in furtherance of its principal object, the limitations of the usual systems and the objections to systems hitherto proposed may be avoided in the following way: A field of view to be transmitted is first converted, by means of a high resolution scanning process, to electrical analog signals. These signals are then modified in two significant regards; first, they are quantized in amplitude to two pre-established values to appear as though they were derived from black and white copy regardless of the intermediate scale of light values in the actual copy and, second, each pulse representative of a narrow black line in the copy of width less than a preassigned minimum, determined by the accommodation of the selected transmission channel, is converted to a pulse whose width is equal to or greater than the preassigned minimum. The signals as thus modified still contain the essential characteristics of the original signals but have been converted to a form which is, in some respects, subjectively superior to the original and is, moreover, especially tailored to the definition demands of the subscriber and the accommodation of the transmission channel. Neither of these departures in any way reduces the intelligibility of the copy but oftentimes enhances its readability. For typewritten or printed material the viewer reasonably infers only that heavy type was employed for printing the original copy and for handwritten material, particularly signatures, he infers that the writer used a broad tipped pen. The typed material is perfectly intelligible and the original characteristics of the signature are faithfully preserved. In either case the substituted version is manifestly acceptable for business purposes. As far as the subscriber is concerned, a modification of this sort may be carried out either at the transmitter station or at the receiver station with the same attending improvements. According to the invention, however, the conversion is preferably performed at the transmitter so that the original copy is not only clarified, but the signals are made eminently suitable for transmission, without serious impairment, over a channel of greatly reduced bandwidth.

At the receiver station, the modified signals are immediately available for producing a facsimile record of the copy without the necessity of a reconversion to their original unmodified form. This is, of course, a great advantage since it markedly reduces the complexity of the receiver terminal equipment which, in most code transmission systems, is necessarily as extensive as the transmitter terminal equipment.

Thus, in one aspect the invention comprises a system for predistorting certain components of a signal waveform in such a way as to render the signal waveform more suitable for transmission over a channel having a reduced bandwidth-transmission time product which still retaining the essential information-carrying characteristics of the signal.

In its simplest form, the above-described conversion and modification of a field of view for transmission over a band limited channel is effected by scanning the original copy with an effective scanning spot of smaller than normal X dimension, that is, linear spot dimension in the direction of scanning. If the peak-to-peak value of the signal derived from the scanner is to represent satisfactorily the peak-to-peak reflectance character of the copy, the scanning spot X dimension must be less than the dimensions of the smallest detail in the subject copy. It has been observed that the width of lines in most signatures and typed material on conventional account cards is approximately five thousandths of an inch. For proper reproduction of such lines, a scanning spot small enough that the scanner is capable of 200 or more lines per inch resolution is entirely satisfactory. Signatures can be identified and account cards satisfactorily read over a system having approximately eighty lines per inch resolution. Hence, the scanning spot may be elongated in the Y dimension to permit fewer scanning lines to be used to cover a given field of view and, so long as the spot dimension in the direction of scanning is as small or smaller than the linear dimension of the smallest such detail in that direction, a recording made with an enlarged scanning spot at the receiver will be perfectly suitable for the contemplated use.

A loss of peak amplitude and the associated high degree of degradation normally experienced in transmitting such signals over a band limited channel is prevented by applying the fine definition analog signals to a signal processing unit which comprises a signal quantizer and a selective pulse stretcher. The quantizer, which may conveniently take the form of a two-value slicer, is employed to restrict the derived electric signals to either of two values representing, for example, full black for the inked portions and white for all background material. Most business data, either in the form of typewritten or printed material or handwritten notes, can better be preserved in substance during facsimile transmission if it is thus restricted prior to transmission to two representative values without intermediate shades; and if, in addition, the loss of contrast in the reproduction of fine detail portions of the material is minimized. A great majority of business data preserved on standard file data cards used in automatic sorting and accounting machines and the like is already in this form. It advantageously permits duplicates or prints to be made on one of the instantaneous reproduction systems used in many offices. From the transmission standpoint, two-value picture signals are eminently suitable for directly driving electron display devices, such as cathode beam tubes, which may be employed as monitors at the transmitter station or as display devices at the receiver station. For original copy already in a two-valued form, for example, black and white printed copy, slicing materially aids in improving the signal-to-noise ratio of the derived signals.

While scanning of the subject copy with a high definition spot faithfully preserves the finest lines in the copy, propagation over a band limited transmission system of the two-valued electrical signal counterpart of these lines may result in a substantial loss in peak amplitude of the narrower signal pulses. This loss may be of such an extent that these pulses are lost altogether. Since it has been found that the absolute width of the lines forming the finest parts of typed characters or strokes of written material need not be preserved accurately so long as the spatial configurations and form of the characters or strokes are preserved, it is in accordance with the present invention to alter the characteristics of the thinnest lines by effectively reenforcing or widening these thin lines before transmission so that their peak amplitudes are preserved. Accordingly, the two-valued analog pulses emanating from the signal slicer are stretched in accordance with one of various stretching programs. A simple possibility is to stretch all pulses by a constant amount. However, this means that a pulse which is already of adequate length for transmission is lengthened unnecessarily. In accordance with a preferred embodiment of the invention, a stretching program is followed in which only pulses shorter than those resulting from scanning with an X dimension equal to D are stretched to duration D while all longer pulses are left completely unchanged. In this form of nonlinear stretching, compatibility is maintained between the fine detail resolvability necessary in the transmitter station scanner, and the more tolerant viewer demands in the ability of the receiver station scanner to reproduce selected types of picture material.

The invention will be fully understood from the following detailed description of certain illustrative embodiments thereof taken in connection with the appended drawings, in which.

Figure 1:
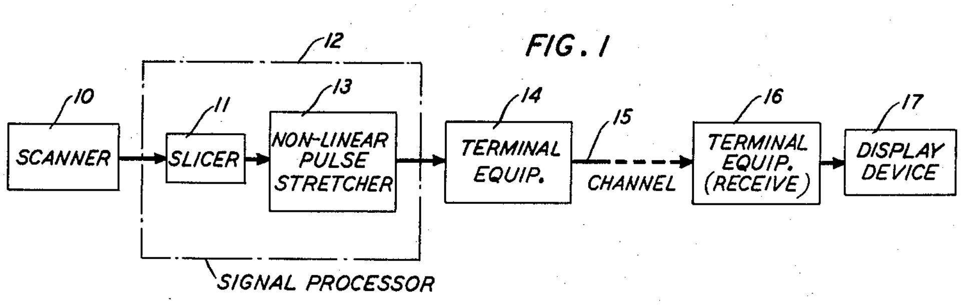
Fig. 1 is an overall block schematic diagram showing the relation of various circuit units to explain the general features of the invention.

Referring now to Fig. 1 a high definition scanner is indicated by block 10. This may, for example, comprise apparatus for converting an optical image of a field of view into a complex electrical image signal as a function of time. Apparatus of this type is well known in the facsimile and television arts and need not be described. Suffice it to say that such apparatus may be fully electronic or electromechanical. For a picture arranged to occupy an area of five inches by one and one quarter inches, scanning at twenty lines per second for a total of one hundred lines per picture results in one complete picture scanning in approximately five seconds and at a horizontal resolution of three hundred lines. If the horizontal resolution at the receiver is equal to the vertical resolution, i.e., three hundred lines, the horizontal resolution will be very nearly equal to good conventional television quality.

Analog signals derived from the scanner 10 are converted to pulses by passing them through slicer 11 included in a signal processing unit 12. The resulting pulses, which instantaneously assume either of two values corresponding, for example, to background for one value and to inked lines for the other, are next altered in duration by pulse stretcher 13 in accordance with a nonlinear stretching program. In a preferred stretching program the duration of pulses representative of fine lines in the subject copy is increased to a longer and minimum value so that the peak amplitude of the pulses is satisfactory accommodated by the transmission channel. These signals are then placed in suitable form for transmission in terminal equipment 14 which may include the necessary modulators and transformers for coupling the signals to a program transmission channel 15. The program channel may have a nominal bandwidth of three kilocycles for typical system outlined above.

Receiving terminal equipment 16 includes the necessary transformers and demodulating units for preparing the received signals for utilization. Noise components may be removed, if desired, by subjecting the demodulated pulses to correction in a conventional slicer (not shown) before applying the signals to a display device 17. No reconversion of the received pulses to their original unmodified form is necessary. The received pulses may immediately be applied to the device 17 wherein they are converted to a visible image of the subject copy on a record medium. This medium may comprise any physical medium on which an image of the subject copy is reproduced such as, for example, electrostatic or electrothermal material. It preferably comprises a direct recording surface forming a part of a cathode beam tube using electrical storage. Direct view or display storage tubes suitable for this purpose are well known and may comprise, for example, one of the class of devices known commercially as the "Iatron" bright trace storage tube, or one of the devices of the class known as "Dark Trace Tubes," and the like.

Figure 2:
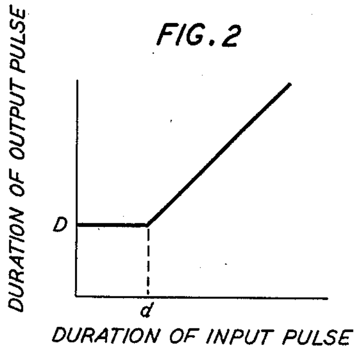
Fig. 2 is a graph of the input-output characteristic of a a nonlinear pulse stretcher suitable for use in the practice of the invention.

In order the better to understand the operation of the invention it will be helpful to refer to Fig. 2 which is a graph of the input-output characteristic of the nonlinear pulse stretcher 13. As illustrated, all input pulses of duration less than D, the preassigned minimum duration determined by the bandwidth-time product, are stretched to duration D, and all pulses of greater duration are left completely unchanged.

Figure 3:
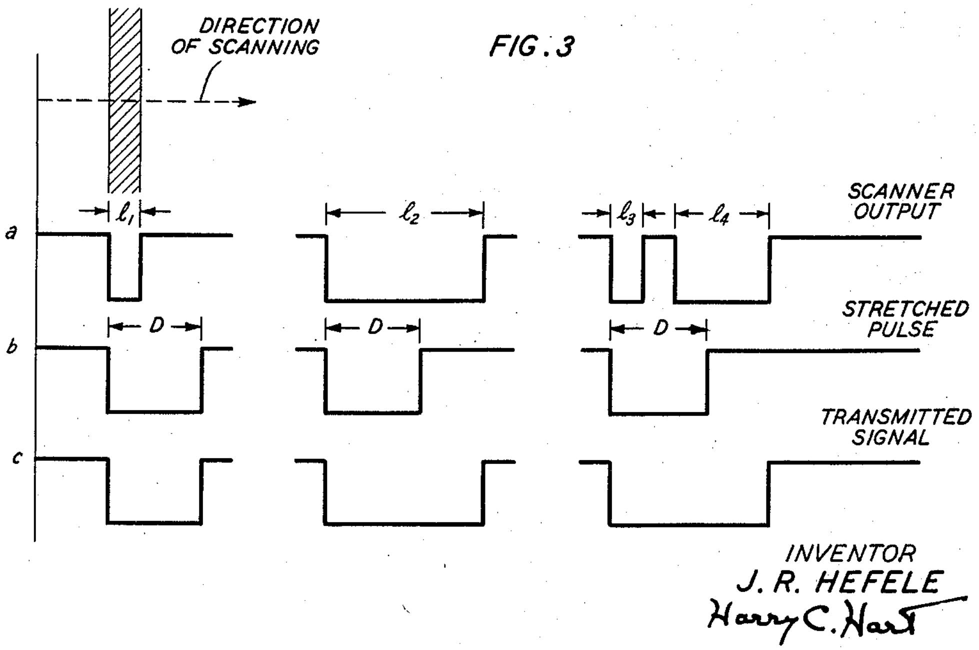
Fig. 3 is a group of several graphs helpful in explaining a nonlinear pulse stretching program according to the invention.

This principle is further illustrated in the set of graphs forming Fig. 3. When a signal voltage is developed by scanning a given area of an image in a given coordinate direction, a voltage pulse is produced which is processed to have one value for all areas indicative of the low density background and a second value for all areas of substantially greater density. For example, the dark band illustrated in column one of Fig. 3 has a density of sufficient value to produce at the scanner output a pulse of duration $l_1$. This pulse is illustrated in line *a* immediately below the dark band. If transmitted over a channel of reduced bandwidth, the peak amplitude of this pulse would be seriously impaired. Accordingly, this pulse is stretched to duration D, shown in line *b*, after which it may successfully be transmitted and used at the receiver to produce a suitable approximation of the original picture element. Should the output of the scanner be a pulse of greater duration than the minimum duration D, the pulse is transmitted without modification. Thus, as illustrated in the second column of Fig. 3, when there exists a pulse of duration $l_2$ greater than the minimum D, it is this pulse that is transmitted. If the scanner output comprises the sequence of pulses including $l_3$ and $l_4$, shown in column 3, of such duration and recurrence that a complete cycle of pulse $l_3$ and the leading edge of pulse $l_4$ occur within the period D, the shorter pulse $l_3$ will be blended into a single pulse of duration $l_3+l_4+$ that portion of D necessary to bridge the two into a single pulse. Other combinations of pulses are treated in similar fashion whereby a minimum duration D is obtained for all pulses. Pulse stretching is thus effected only for these shortest duration pulses; normal linear operation characterizes all other transmissions.

Figure 4:
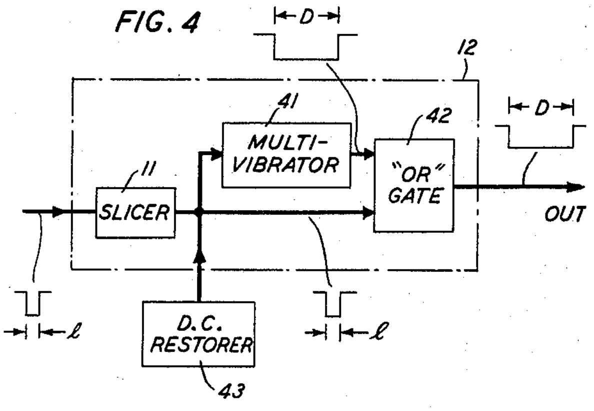
Fig. 4 is a block schematic diagram of a simple illustrative signal processing unit.

As an illustration, Fig. 4 shows simplified apparatus for processing in the manner described above, the analog pulses emanating from facsimile scanner 10. The electrical signals developed in the scanner are passed first through conventional two-level slicer 11 and then impressed on two paths. The first path includes a monostable multivibrator 41 having a relaxation period equal to D. In conventional fashion, the leading edge of any input pulse triggers the multivibrator which in turn completes one cycle of oscillation in a period D and produces an output square wave pulse of duration D. The output of the multivibrator is coupled directly to an "OR" logic circuit, for example, "OR" gate 42. This circuit may comprise any of the "OR" type gate circuits well known in the computer art. It is characteristic of these circuits that so long as there is an input signal impressed on one or the other of its two input terminals, there will be a signal at its output terminal. The second path couples the modified signal from the slicer 11 directly to the second input of "OR" circuit 42. In operation an incoming pulse, assumed to be negative and of duration *l* in this illustration, reverses the state of multivibrator 41 for a period D, and energizes the "OR" circuit 42 for a period of duration *l*. The "OR" circuit output consequently is held negative so long as either the pulse of duration *l* or the pulse of duration D persists. The later pulse to expire, after an elapsed time D or *l*, whichever is the greater, controls the output pulse duration. In the event that a second pulse appears at the input before the pulse D has expired from the first triggering, the two pulses will emerge as a single pulse lasting from the beginning of the first to the end of the second as illustrated in column 3 of Fig. 3.

Since conventional slicers, multivibrators, amplifiers and the like usually employ nonconductive couplings such as capacitors, the direct current component of the signal passing through the unit is lost. Light values in a picture scene, however, are established electrically relative to a given background brightness level and are represented by the direct current component of the signal. To restore the direct current component and reestablish the reference level prior to transmission, a conventional direct current restoration circuit 43 is coupled to the processing unit, for example, at the slicer output.

Figure 5:
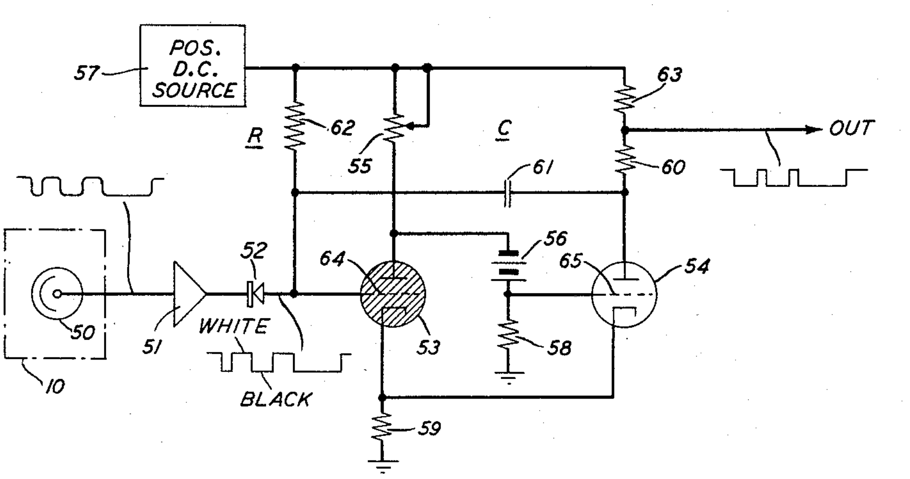
Fig. 5 is a schematic circuit diagram of a multifunction electronic network which operates both as a two-value slicer and as a nonlinear pulse stretcher in accordance with a preferred form of the invention.

In accordance with a preferred form of the invention, instability resulting from the periodic loss of a reference value, and the individual circuit complexity of the signal processing unit illustratvely described above are overcome n a novel manner. Fig. 5 is a schematic circuit diagram of a practical multifunctional signal processing unit 12 which effects both the two-level slicing operation and nonlinear pulse stretching operation of units 11 and 13, respectively of Fig. 1, in a single electronic circuit. The operation of this circuit is as follows.

Positive signal pulses derived from the multiplier photoelectric tube 50 in the scanner 10 are amplified to a peak-to-peak value of approximately thirty volts and inverted in polarity in conventional amplifier 51. The resulting negative pulses are directly coupled by the asymmetrically conducting device 52 to the control element 64 of electron discharge device 53. Device 52 may be, for example, a simple diode and device 53 a vacuum tube triode.

Signal slicing takes place by virtue of the biasing of the cathode coupled stages including triodes 53 and 54, connected in a circuit which, in some respects resembles a conventional cathode-coupled regenerative slicer. The level of signal slicing is adjusted by changing the grid voltage on triode 54 through variations in the resistor 55 which connects the anode of tube 53 to a source of positive potential 57. The anode of tube 53 is conductively coupled through bias source 56 to the grid 65 of tube 54. Bias source 56 is illustrated as a battery but may, if desired, advantageously be replaced by a gas tube according to any of the techniques well known in the art. The bias circuit is completed by returning the grid of tube 54 to ground through resistor 58.

In the quiescent state, tube 53 is conducting and tube 54 is cut off. In this condition, the potential appearing at the control element 64 of tube 53 is sufficient to maintain the diode 52 fully conducting. When a negative signal pulse emanating from the amplifier 51 arrives at the output of diode 52, and hence control element 64, it reduces the cathode voltage of tube 53 by follower action and, since the cathodes of tubes 53 and 54 are connected together and to ground through resistor 59, plate current in tube 54, previously zero, is quickly turned on. A negative voltage pulse is developed across the plate resistor 60 and is fed back through capacitor 61 to grid 64 of tube 53. The grid potential of tube 53 which was previously reduced below cutoff by the signal applied through diode 52 is reduced still further by the negative pulse returned through this positive feedback path. As a result, the ensuing change of state is extremely rapid. The pulse fed back also disconnects the grid 64 of tube 53 from the low impedance signal driver 51 by inactivating diode 52. Capacitor 61 now charges through resistor 62, which resistor is connected between the source 57 and the junction of capacitor 61, the grid 64, and the anode of diode 52. It charges to the cathode potential of diode 52, i.e., the potential of the output of amplifier 51, at which point the diode becomes again conductive and returns the control of the slicer condition to the amplifier 51.

If the signal pulse duration is longer than the time constant of the RC network 62—61, the charge cycle of capacitor 61 is terminated when the charge on capacitor 61 reaches the constant triggering potential of the amplifier 51. The slicer circuit is, therefore, held in the triggering condition for the full duration of the pulse, however long it may be, since the voltage of the amplifier 51 is controlling. If the signal pulse duration is shorter than the time constant of the RC circuit, the potential appearing at the terminal of amplifier 51 becomes more positive upon termination of the signal, the diode 52 remains inactive, and the charge cycle of capacitor 61 is the controlling factor in terminating the triggered cycle just as in the case of a monostable multivibrator.

By connecting the charging resistor 62 to the positive supply potential, a more linear portion of the timing exponential curve is used, and there is little measurable pulse lengthening of signal pulse where durations are of the same order of magnitude as the time constant of the RC circuit.

Thus, the output pulse developed across the resistor 60 has a duration determined by the RC circuit alone for signal pulses shorter in duration than the time constant of the slicer; and by the length of the input pulses themselves if their time duration is greater than the time constant of the slicer RC circuit. These rectangular pulses, each of which has a minimum duration of D, and may be, in the practical case, approximately 160 microseconds in duration, can be transmitted through a band limited system of three kilocycles without serious impairment and can be utilized satisfactorily in a facsimile recorder.

Figure 6:
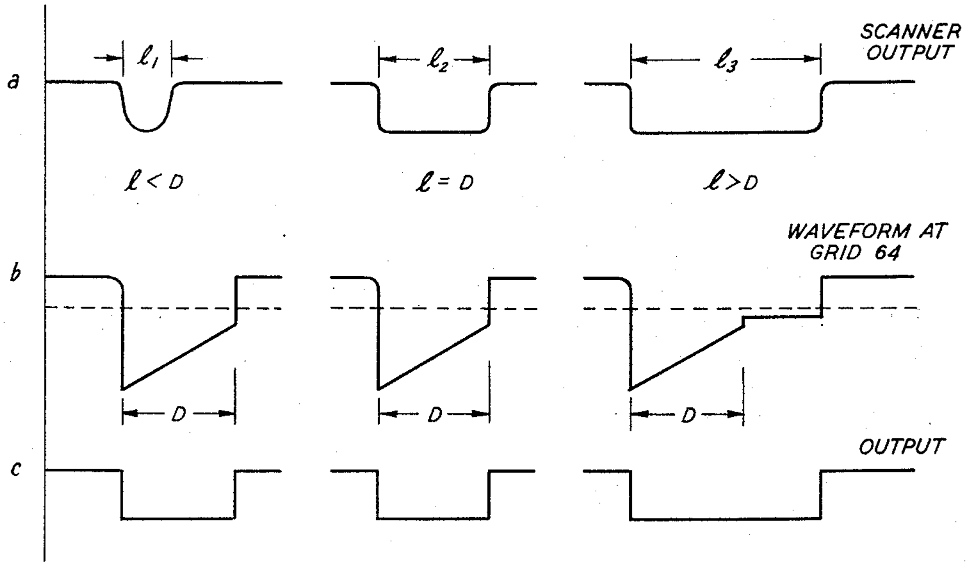
Fig. 6 is a group of several graphs helpful in explaining the operation of the electronic circuit of Fig. 5.

Representative waveforms illustrating the operation of the above-described multifunctional signal processing unit for three different input signal situations are shown in Fig. 6. In the first column, a typical electrical wave produced by the photoelectric cell 50 is shown after conversion to a pulse of duration $l_1$. This pulse is passed through the diode 52 of Fig. 5 to the grid 64 of tube 53 which tube has been conducting current. This causes the tube 53 to approach cut-off and the tube 54 to become conductive. Because of the positive feedback path through capacitor 61, this change of state is very rapid, driving grid 64 still further negative. The source of input signals is now removed from the grid of tube 53 and has no further effect in maintaining the slicer in its unstable state inasmuch as diode 52 is now nonconductive. Charging of capacitor 61 to a value sufficient to cause tube 53 to become again conductive takes place in D microseconds. A waveform of this charging cycle is illustrated in line *b* of column 1. Since pulse $l_1$ was of shorter duration than D, the tube 53 is free to commence conducting as soon as capacitor 61 reaches the preassigned potential D microseconds later. A return to the stable state completes the cycle and a rectangular wave, D microseconds in duration, appears at the output of the slicer. In column two of Fig. 6, an input pulse $l_2$ is illustrated as having a duration equal to that of the RC charge time D. Hence the leading edge of pulse $l_2$ triggers the circuit which, as before, completes one cycle in time D. The output pulse is again a rectangular pulse of D microseconds duration. In column 3 of Fig. 6 a situation is illustrated in which the input pulse $l_3$ is considerably longer than the time D. After the tubes 53 and 54 initially change state, as before, the charging cycle commences and in D microseconds the potential of capacitor 61 has increased to the potential of the amplifier 51 and diode 52 becomes conductive. Negative pulse $l_3$ still persists at the output of amplifier 51, diode 52 is maintained in a conductive state so that the amplifier output potential is the controlling factor in determining the duration of the output rectangular pulse.

So long as the pulse $l_3$ persists, the slicer remains in its unstable state. At the termination of the pulse, the potential at the grid 64 again rises and the slicer returns to its stable state. By setting the time constant of the processing circuit to D microseconds, signal pulses arriving at the slicer input having a duration of less than D are lengthened and appear at the output as sliced rectangular pulses of D duration; the signal pulses of longer duration are merely regeneratively sliced to rectangular pulses with their longer duration undisturbed. The output signals of the unit are, in either case, clean rectangular pulses corresponding to high density portions of the subject copy.

Although the invention has been described with reference to certain specific embodiments, numerous modifications and other applications will readily occur to those skilled in the art.

What is claimed is:

1. In a signalling system, a source of electrical signal pulses characterized by a relatively wide range in the lengths of its several pulses, a transmission channel capable of passing signals having a narrower range of pulse length, and means for modifying said several pulses to the pulse length range accommodated by said channel, said modifying means including means for electrically lengthening all of said several pulses having less than a preassigned minimum duration.

2. In a facsimile system, a scanning element, means for deriving from said scanning element electrical time signals, said time signals having certain portions above a preassigned threshold and certain other portions below said preassigned threshold, and means for modifying said electrical time signals for transmission over a channel of limited bandwidth, said modifying means including means for electrically increasing the duration of each of said other signal portions to said preassigned threshold value.

3. In a signalling system, means at a transmitter station for modifying a signal for transmission over a channel of limited bandwidth which comprises means for converting said signal into a two-valued function, means for modifying said two-valued function by reducing the rapidity of fluctuation of the most rapidly fluctuating portions of said signal, whereby the modified signal closely represents the original signal and is in a form suitable for transmission over said channel, means for transmitting said modified signal over said channel to a receiver station, and means at said receiver station for utilizing said modified signal in said modified form and without restoration to its original form.

4. A system for the transmission of electrical signals defining copy composed of signatures and numerals over a channel of limited bandwidth which comprises means for scanning said copy to obtain high definition analog signals therefrom, means for converting said analog signals to two-valued pulses, means for electrically lengthening only the shorter ones of said pulses to a preassigned minimum length, and means for transmitting said pulses as modified over said channel.

5. The system defined in claim 4 wherein said means for electrically lengthening the shorter ones of said pulses to a preassigned minimum length comprises means for generating for each of said shorter pulses an auxiliary pulse having a length equal to said preassigned length, and means including a gating circuit simultaneously supplied with said two-valued pulses and said auxiliary pulses for supplying as an output signal either said two-valued pulses or said auxiliary pulse, whichever is the greater in length.

6. In a system for the transmission of copy composed of signatures and numerals over a channel of limited bandwidth, means at a transmitter station for scanning said copy to derive therefrom analog signals, means for converting said analog signals to electrical pulses, means for quantizing said pulses, and means for electrically lengthening the shorter ones of said pulses to a preassigned minimum length thereby to bring said pulses within said limited bandwidth whereby said pulses as modified may be transmitted over said channel.

7. In a system as defined in claim 6, means at a receiver station for utilizing said pulses as modified to construct a reproduction of said copy.

8. A communication system comprising a scanning element, means for causing said scanning element to progress along a rectilinear path to scan a line of a field of view, means for causing said element to progress in a direction perpendicular to said first-named direction at the completion of each of said line scans, means for deriving from said scanning element electrical time signals, means for modifying said electrical time signals for transmission over a channel of limited bandwidth, said modifying means including means for quantizing said electrical time signals, means for electrically increasing the duration of each of said time signals having a duration less than a preassigned minimum value, and means for passing said time signals which have been increased in duration and for passing in unaltered form each of said time signals having a duration equal to or greater than said preassigned minimum value.

9. In a facsimile system, a high definition scanning element, means for causing said scanning element to progress along a rectilinear path to scan a line of a field of view, means for causing said element to progress in a direction perpendicular to said first-named direction at the completion of each of said line scans, means for converting analog signals derived from said scanning element into two-valued electrical time signals, means for modifying said two-valued electrical time signals for transmission over a channel of limited bandwidth, said modifying means including means for electrically increasing the duration of selected ones of said time signals to a preassigned minimum value, and for retaining the original duration of the remaining ones of said time signals.

10. A communication system for transmitting signals representative of the light values of an object field over a narrow band channel which comprises means at a transmitter station for scanning said field with a scanning spot whose linear dimension in the direction of scanning is smaller than that of the finest detail in said field to obtain a sequence of signal pulses, pulse stretching means for increasing to a period D the duration of those of said pulses whose durations are less than said period D to form a modified pulse sequence, and means at a receiver station for converting said resulting modified sequence of said pulses into a visible image.

11. A visual communication system for transmitting signals representative of the light values of an object field over a narrow band channel which comprises means at a transmitter station for scanning said field with a scanning spot whose linear dimension in the direction of scanning is smaller than that of the finest detail in said field to obtain a sequence of signal pulses, each of said pulses representing a single scanned area of one of said light values, means for converting said signal pulses to one of two preassigned amplitude levels, pulse stretching means for increasing to a period D the duration of those of said pulses whose durations are less than said period D to form a modified pulse sequence, and means at a receiver station for converting said resulting modified sequence of said pulses into a visible image.

12. A visual communication system for transmitting signals representative of the light values of an object field over a narrow band channel which comprises means at a transmitter station for orthogonally scanning said field with a scanning spot whose linear dimension in the direction of scanning is smaller than that of the finest detail in said field to obtain a sequence of signal pulses, each representing a single scanned area of one of said light values, the duration of each of said pulses being thus representative of a dimension of said single area of said field, means for quantizing said signal pulses, pulse stretching means for selectively increasing to a period D the duration of all pulses having a duration less than D to form a modified pulse sequence, and means at a receiver station for converting said resulting modified sequence of said pulses into a visible image.

13. In a communication system a selective pulse lengthening circuit, said circuit comprising a source of two-valued electric pulses, a monostable multistate device having an input terminal and an output terminal, said monostable device having a relaxation period, asymmetrically conductive means for coupling said source of electric pulses to the input terminal of said monostable multistate device, and means for altering the relaxation period of said monostable device in response to said two-valued electrical pulses applied to said circuit having a duration greater than D.

14. In a communication system a selective pulse lengthening circuit, said circuit comprising a source of two-valued electrical pulses, a first electron discharge device having a control electrode, a cathode and an anode, a second electron discharge device having a control electrode, a cathode and an anode, said cathodes being connected together, a source of constant potential having a positive terminal and a negative terminal, adjustable impedance means for connecting the anode of said first discharge device to said positive terminal, impedance means for connecting the anode of said second device to said positive source, means for connecting said connected cathodes to said negative terminal, means conductively coupling the anode of said first device to the control element of said second device, asymmetrically conducting means for coupling said two-valued electrical pulses to said control element of said first device, output means connected between the anode of said second device and said negative terminal, means for regeneratively coupling the anode of said second device to the control electrode of said first device, and means for establishing for each applied two-valued pulse the relative periods of conduction of said electron discharge devices in accordance with either the time constant of said regenerative coupling means, or said instantaneously applied two-valued electrical pulse, whichever is the greater.

15. In a system for the transmission of electrical signals defining copy composed of handwritten and typewritten material over a channel of limited bandwidth, the method of processing said electrical signals for transmission over said channel in a manner whereby the peak amplitudes of said electrical signals are substantially preserved which comprises scanning said copy at a transmitter station with a high resolution spot to derive therefrom high definition analog signals, converting said analog signals to two-valued electrical pulses, electrically increasing the duration of only the shorter ones of said pulses to a preassigned minimum duration, said minimum duration being a function of the bandwidth limitations of said channel, transmitting said pulses as modified over said channel, and utilizing said pulses as modified at a receiver station to construct therefrom a reproduction of said copy.

References Cited in the file of this patent

UNITED STATES PATENTS

| | | |
|---|---|---|
| 2,191,057 | Durkee | Feb. 20, 1940 |
| 2,566,827 | Dean et al. | Sept. 4, 1951 |
| 2,653,237 | Johnstone et al. | Sept. 22, 1953 |
| 2,729,699 | Long | Jan. 3, 1956 |
| 2,760,008 | Schade | Aug. 21, 1956 |